US006681143B2

(12) United States Patent
Deecke et al.

(10) Patent No.: US 6,681,143 B2
(45) Date of Patent: Jan. 20, 2004

(54) MATCH GRINDING OF SPOOL TO CONTROL VALVE BODY OF OIL ACTIVATED FUEL INJECTOR

(75) Inventors: Arved Deecke, Columbia, SC (US); Peter Hubl, Columbia, SC (US); Martin Lenk, Blythewood, SC (US); Douglas Smith, Blythewood, SC (US)

(73) Assignee: Siemens Diesel Systems Technology, Blythewood, SC (US)

( * ) Notice: Subject to any disclaimer, the term of this patent is extended or adjusted under 35 U.S.C. 154(b) by 0 days.

(21) Appl. No.: 10/099,975

(22) Filed: Mar. 19, 2002

(65) Prior Publication Data

US 2003/0177625 A1 Sep. 25, 2003

(51) Int. Cl.[7] .......................... G06F 19/00; B24B 49/00
(52) U.S. Cl. .......................... 700/164; 451/8; 73/119 A
(58) Field of Search ................................ 700/159, 164; 451/5, 8, 51; 73/119 A; 137/625.23; 239/533.8

(56) References Cited

U.S. PATENT DOCUMENTS 3,557,824 A * 1/1971 Krehbiel et al. ............ 137/375
5,479,901 A * 1/1996 Gibson et al. .............. 123/472
5,640,987 A * 6/1997 Sturman ........................ 137/1
5,868,165 A * 2/1999 Tranovich .............. 137/625.23
6,142,394 A * 11/2000 Hefler et al. ............. 239/533.8
6,174,219 B1 * 1/2001 Mathews ....................... 451/8

* cited by examiner

*Primary Examiner*—Leo Picard
*Assistant Examiner*—Douglas S. Lee
(74) *Attorney, Agent, or Firm*—McGuireWoods LLP

(57) ABSTRACT

A method is provided for matching dimensions of a spool to a control valve body of a fuel injector. The method includes the steps of measuring land locations and an overall length of a first component of the fuel injector and measuring land locations of a second component of the fuel injector relative to at least each other. The method also includes calculating a grinding amount to be removed from the second component based on the following criteria (i) the measured land locations and the overall length of the first component and (ii) the measured land locations of the second component relative to each other.

20 Claims, 3 Drawing Sheets

MATCH GRINDING OF SPOOL TO CONTROL VALVE BODY OF OIL ACTIVATED FUEL INJECTOR

BACKGROUND OF THE INVENTION

1. Field of the Invention

The present invention generally relates to match grinding of components of an oil activated fuel injector and, more particularly, to match grinding a spool with a control valve body of an oil activated electronically or mechanically controlled fuel injector.

2. Background Description

There are many types of fuel injectors designed to inject fuel into a combustion chamber of an engine. For example, fuel injectors may be mechanically, electrically or hydraulically controlled in order to inject fuel into the combustion chamber of the engine. In the hydraulically actuated systems, a control valve body may be provided with two, three or four way valve systems, each having grooves or orifices which allow fluid communication between working ports, high pressure ports and venting or drain ports of the control valve body of the fuel injector and the inlet area. The working fluid is typically engine oil or other types of suitable hydraulic fluid which is capable of providing a pressure within the fuel injector in order to begin the process of injecting fuel into the combustion chamber.

In current designs, a control valve of the fuel injector controls the flow of the working fluid from the high pressure supply (known as the rail) to the intensifier chamber and hence the intensifier piston (i.e., fill position), as well as controls the flow of the working fluid from the intensifier chamber to ambient (i.e., drain position). More specifically, a driver delivers a current or voltage to an open side of an open coil solenoid or endcap. The magnetic force generated in the open coil solenoid will shift a spool into the open position so as to align grooves or orifices (hereinafter referred to as "grooves") of the control valve body and the spool. The alignment of the grooves will create a "fill" channel which permits the working fluid to flow into an intensifier chamber from an inlet portion of the control valve body (via working ports). That is, connections to "fill" (or "drain") are established when the edges of the grooves of the spool and the control valve (the open- and close-lands) overlap.

The fill and drain channels must be manufactured within very tight tolerances in order to ensure greater predictability of the fuel injector which, in turn, leads to increased fuel efficiency even at lower fuel quantities. By way of example, once the fill channel is established, the high pressure working fluid acts on an intensifier piston to compress an intensifier spring and hence compress fuel located within a high pressure plunger chamber. As the pressure in the high pressure plunger chamber increases, the fuel pressure begins to rise above a needle check valve opening pressure. At the prescribed fuel pressure level, the needle check valve will shift against the needle spring and open the injection holes in a nozzle tip. The fuel will then be injected into the combustion chamber of the engine. If the fill channel is not within prescribed tolerances, the pressure within the high pressure plunger chamber may not be predictable which would negatively affect the action of the needle check valve and hence the fuel efficiency of the fuel injector.

After the injection cycle, the working fluid may be drained to ambient. To provide the drain, a driver delivers a current or voltage to a closed side of a closed coil solenoid or endcap. The magnetic force generated in the closed coil solenoid will shift the spool into the closed position so as to align grooves of the control valve body and the spool. The alignment of the grooves will create a "drain" channel which permits the working fluid to flow from the intensifier chamber of the control valve body to ambient. That is, connections to "drain" are established when the edges of the grooves of the spool and the control valve (the close-lands) overlap. At this time, the intensifier spring will bias the intensifier piston upwards and fuel will then flow into the high pressure plunger chamber to begin another cycle. However, if the drain channel is not within prescribed tolerances, again the predictability of the fuel injector will be adversely affected thereby decreasing fuel efficiency.

With this now understood, it should be well understood that the injector function is strongly influenced by the size of the overlap length of the drain and fill channels. It is the size of these overlap lengths which determines the quantity of working fluid that can flow through the valve for a certain pressure in a certain amount of time. Another important factor in the influence of the injector is the total amount of the spool stroke in the control valve body, i.e., the distance that the spool can travel inside the control valve body from the open to the closed solenoid.

In order to keep the injector function in narrow tolerances, the control valve body and the spool have to be manufactured with very small tolerances. Currently all dimensions for the control valve body and the spool (five dimensions for each of the body and spool), which have an influence on the overlap lengths, are manufactured with a plus/minus tolerance of only a few microns. This translates into ten dimensions with very small tolerances. But, in present manufacturing techniques, spools and control valve bodies are not matched to one another during assembly; that is, after the spools and control valve bodies are manufactured they are then mixed together and assembled without any regard as to whether the assembled components fall within the specified tolerances for the assembled injector. This results in injectors which are not within the specified tolerance range thus negatively influencing the injector performance.

The present invention is directed to overcoming one or more of the problems as set forth above.

SUMMARY OF THE INVENTION

In an aspect of the present invention, a method is provided for matching dimensions of a spool to a control valve body of a fuel injector. The method comprises the steps of measuring land locations and an overall length of a first component of the fuel injector and measuring land locations of a second component of the fuel injector relative to at least each other. The method also includes calculating a grinding amount to be removed from the second component based on the following criteria (i) the measured land locations and the overall length of the first component and (ii) the measured land locations of the second component relative to each other.

In embodiments of the first aspect of the present invention, the method further includes measuring a distance between one land location of the land locations and an end of the second component, and an overall initial length of the second component. In further aspects, material is removed from the second component based initially from the measured distance from the one land location relative to the end of the second component and the measured overall initial length of the second component.

In another aspect of the present invention, a method of matching dimensions of a spool with a control valve body of a fuel injector includes the steps of measuring land locations and an overall length of a first component of the fuel injector and measuring land locations of a second component of the fuel injector relative to at least each other. The amount go be removed from one of the components is the calculated based on the measured amounts using a linear optimization process.

In embodiments of the second aspect, the method further includes matching land locations of the first component and the second component based on the calculating step such that the land locations of the first component and the second component and an overall length of the first component and the second component optimize an overlap or alignment between the land locations of the first component and the second component without initial regard to specified tolerances. The first and second components are opened or widened and matched with the other of the first and second components by adjusting fewer than all of the dimensions for overlap length and the stroke of the second component based on the calculating step. The fewer dimensions are preferably eight of ten dimensions which are ground according to the calculating step, and the remaining two dimensions, which are pre-manufactured, are adjusted to the eight dimensions to achieve a desired overlap length and stroke between the first and second components after the calculating step.

In still another aspect of the present invention, a method of matching dimensions of a spool with a control valve body of a fuel injector includes measuring (i) a plurality of dimension of a control valve body including a length and distances from one end to a plurality of land locations and (ii) a plurality of land locations of a spool with respect to one another. The plurality of spool land locations preferably correspond to the plurality of control valve body land locations. Once these dimensions are measured, the method includes calculating a grinding amount to be removed from the spool based on the measured land locations and the overall length of the control valve body and the measured land locations of the spool relative to each other.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to match grinding of a spool to a control valve body of an oil activated electronically or mechanically controlled fuel injector. In the match grinding of the present invention, the open and close lands of the spool are match-ground to the open and close lands of the control valve body. The matching grinding of the spool to the control valve body will ensure that greater predictability of the fuel injector can be achieved. This increased predictability also leads to increased fuel efficiency, even at lower fuel quantities. It should be understood that the method used herein can equally apply to (i) match grinding a spool to an existing control valve body of a fuel injector or (ii) match grinding a control valve body to an existing spool. In general, the match grinding of the present invention will be discussed with reference to match grinding of a spool but is equally adaptable to match grinding the control body.

In general, the match grinding of the present invention allows many of the tolerances on one of the components (e.g., spool or control valve body) to be "opened" or "widened", and then matched with another component by adjusting two of the ten dimensions according to a calculation for the overlap length and the stroke (as discussed below). Accordingly, by using the match grinding of the present invention, eight of the ten dimensions can now be manufactured with wider tolerances. The remaining two dimensions, which are pre-manufactured, can then be adjusted to the other dimensions to achieve the desired overlap lengths and stroke between the components. In this manner, each control valve body can be matched to a certain spool thereby ensuring that the entire assembly is within tolerance ranges resulting in a higher predictability and efficiency of the fuel injector.

Embodiments of the Oil Activated Fuel Injector of the Present Invention

Figure 1:
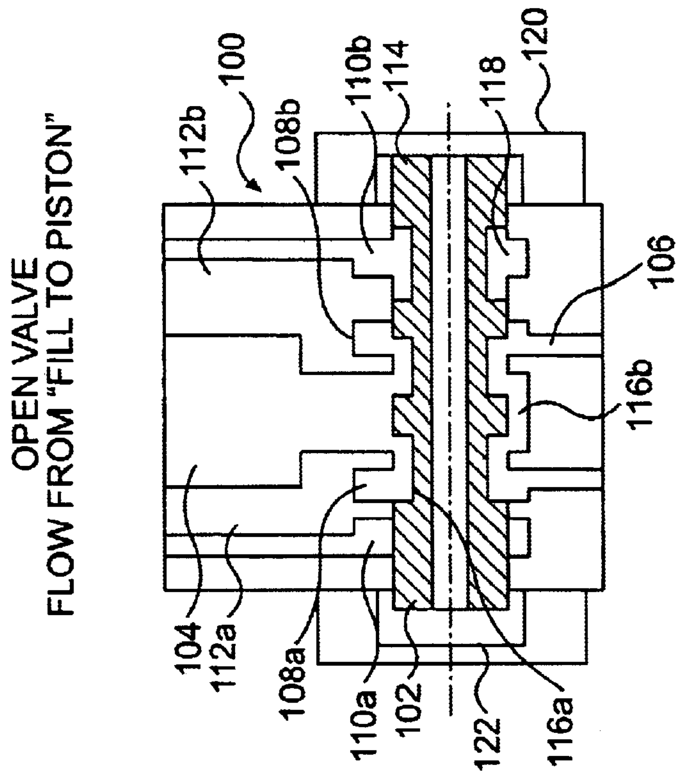
FIG. 1 shows a control valve body and spool in an open position.

Referring now to FIG. 1, an overview of the control valve body and spool in a "fill" or open position is shown. The control valve body is generally depicted as reference numeral 100 and includes a central bore 102 and an inlet area 104 which is in fluid communication with working ports 106. At least one open groove or orifice (hereinafter referred to as open grooves) 108*a* and 108*b* is positioned between and in fluid communication with the inlet area 104 and the working ports 106. At least one drain or close groove (and preferably two ore more) 110*a* and 110*b*, which is located in the control body 100, is in fluid communication with drain ports 112*a* and 112*b*, respectively. The drain ports 112*a* and 112*b* are in fluid communication with the working ports 104 via the drain grooves 110*a* and 110*b*, respectively. In the embodiments of the present invention, the drain ports 112*a* and 112*b* allow the working fluid to flow to ambient.

A spool 114 having at least one open groove or orifice (hereinafter referred to as open grooves) 116*a* and 116*b* is slidably mounted within the centrally located bore 102 of the control valve body 100. The open grooves 116*a* and 116*b* provide fluid communication between the working ports 106 and the inlet area 104 via the open grooves 108*a* and 108*b*, respectively, of the control valve body 100. A close groove 118 is also provided on the spool 114 which provides fluid communication between the working ports 106 and the drain ports 112*a* and 112*b* via the close grooves 110*a* and 110*b*, respectively, of the control valve body 100. It should be noted that, in embodiments, at least one of the open grooves may also substitute as a close groove depending on the particular configuration of the control valve body. By way of example, the open groove 116*a* of FIG. 1 may also act as a close groove for providing fluid communication between the working ports and the drain ports (as shown in FIG. 2).

Still referring to FIG. 1, an open coil 120 and a closed coil 122 are positioned on opposing sides of the spool 114 and are energized via a driver (not shown) to drive the spool 114 between a closed position and an open position. In the open position as shown in FIG. 1, the open grooves 116*a* and 116*b* of the spool 114 overlap (align) with the open grooves 108*a* and 108*b*, respectively, of the valve control body 100 thus allowing the working fluid to flow between the inlet area 104 and the working ports 106 of the valve control body 100.

Figure 2:
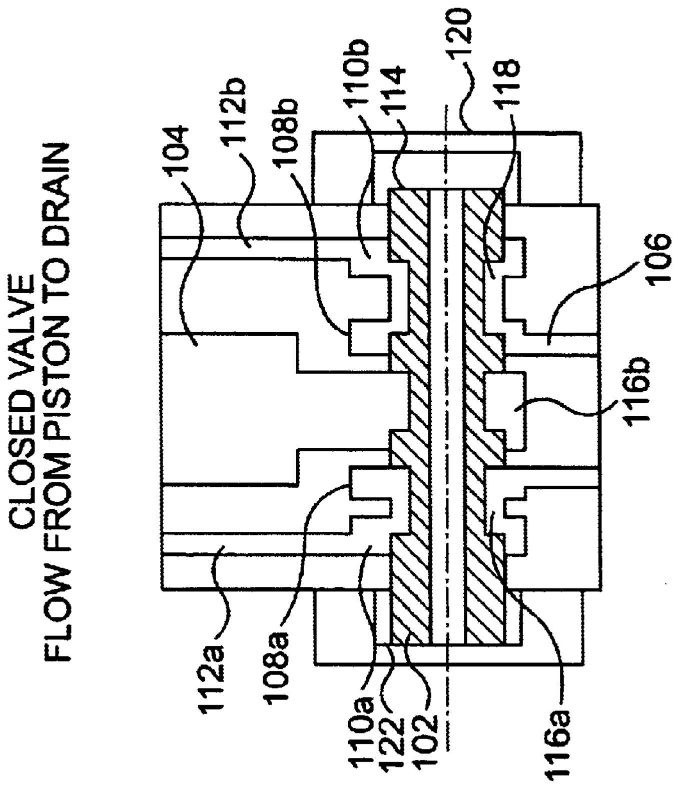
FIG. 2 shows a control valve body and spool in a closed position.

FIG. 2 is an overview of the control valve body and spool in a "drain" or closed position. In this position, the closed coil 122 is energized via a driver (not shown) to drive the spool 114 into the closed position such that the open groove 116*a* as well as the close groove 118 of the spool 114 overlap (align) with the close grooves 110*a* and 110*b* of the valve control body 100. This allows the working fluid to drain from the working ports 106 of the valve control body 100 to the drain ports 112*a* and 112*b* to ambient.

Figure 3:
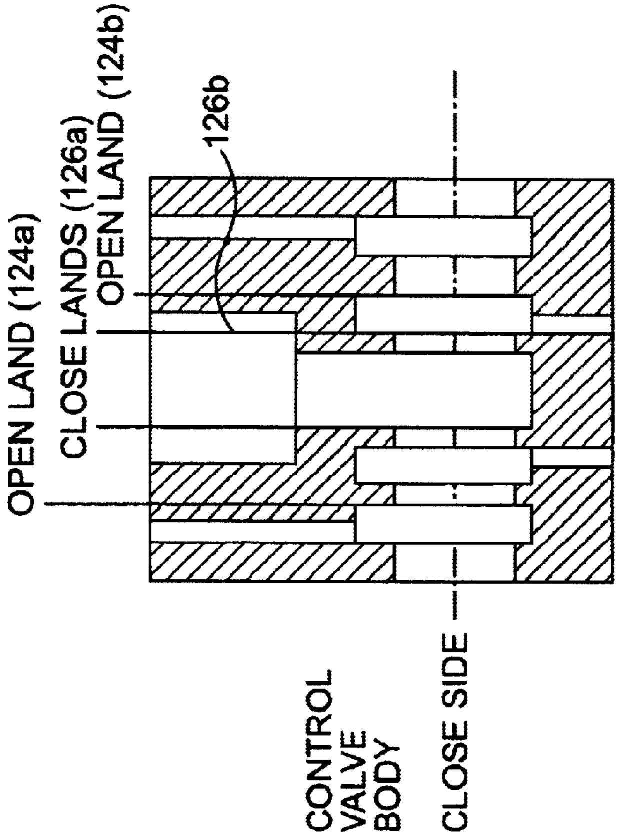
FIG. 3 shows open and close lands of a control valve body on a closed side.
Figure 4:
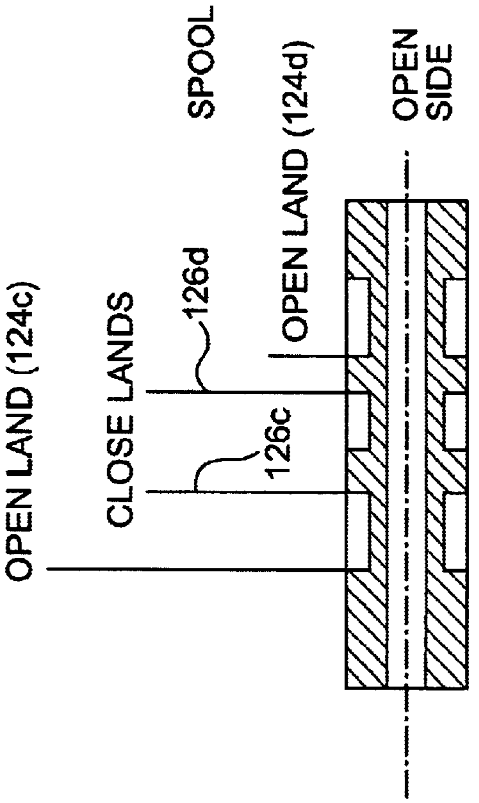
FIG. 4 shows open and close lands of the spool on an open side.

FIGS. 3 and 4 show open and close lands of the control valve body 100 and the spool 114, respectively. The open lands 124*a* and 124*b* of the control valve body 100 overlap with respective open lands 124*c* and 124*d* of the spool 114 when the valve is open (FIG. 1). This alignment allows the working fluid to flow from the inlet area 104 to the working ports 106. Similarly, close lands 126*a* and 126*b* of the control valve body 100 overlap with respective close lands 126*c* and 126*d* of the spool 114 when the valve is closed (FIG. 2). This alignment allows the working fluid to flow from the working ports 106 to the drain ports 112*a* and 112*b* to ambient.

Figure 5:
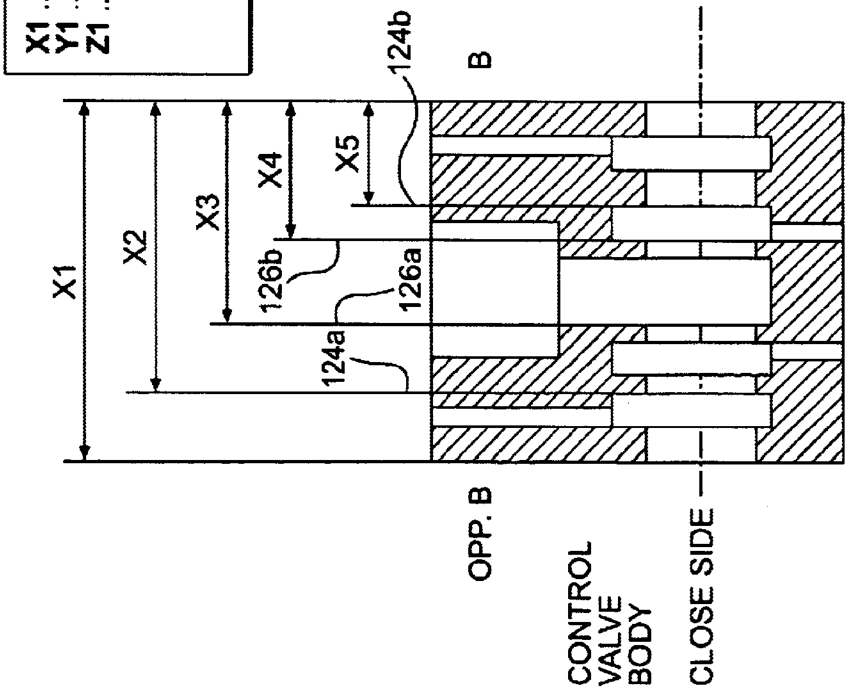
FIG. 5 shows a length of the control valve body and distances of the open and close lands from an end of the control valve body.

FIG. 5 shows a length of the control valve body 100 and distances of the open and close lands from an end of the control valve body 100. Specifically, X1=length of control valve body;

X2=distance from one end of the control valve body to the open land 124*a;*

X3=distance from one end of the control valve body to the close land 126*a;*

X4=distance from one end of the control valve body to the close land 126*b*; and X5=distance from one end of the control valve body to the open land 124*b*.

The measured distances X1 through X5 will be used in an optimization process, as described below, to match grind the spool to the control valve body dimensions.

Figure 6:
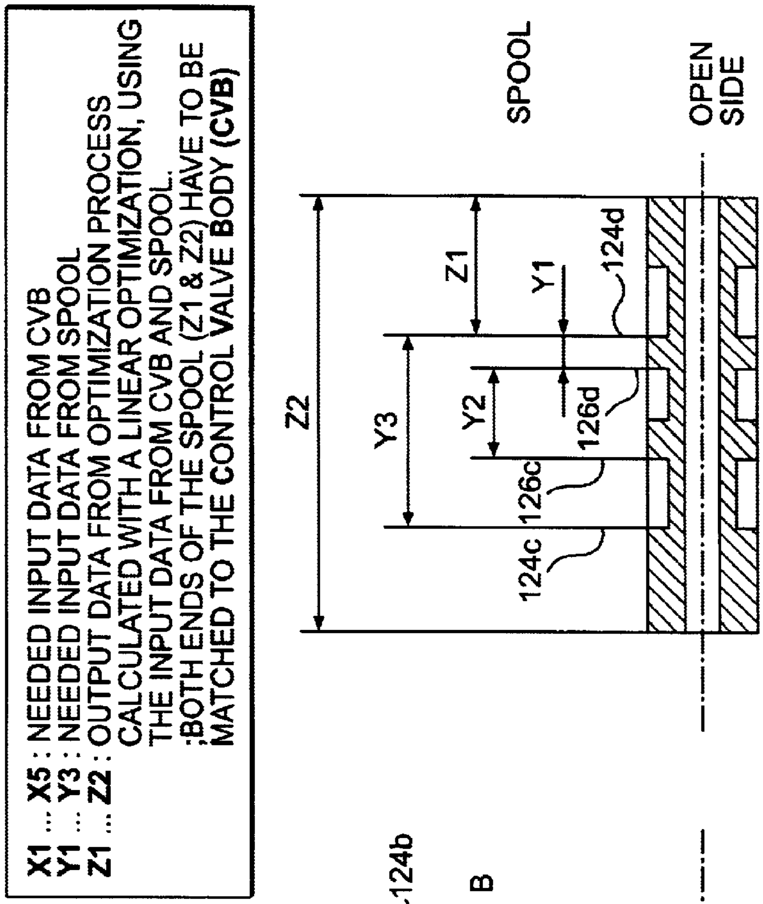
FIG. 6 shows calculated lengths of the spool and certain distances associated with the open and close lands of the spool.

FIG. 6 shows calculated lengths of the spool 114 and certain distances associated with the open and close lands of the spool 114. Specifically, Y1=a distance between the open land 124*d* and the close land 126*d;*

Y2=a distance between the close land 126*c* and the close land 126*d;*

Y3=a distance between the open lands 124*c* and 124*d;*

$Z1_{out}$=a calculated distance between one end of the spool and the open land 126*d*; and $Z2_{out}$=a calculated length of the spool.

Both $Z1_{out}$ and $Z2_{out}$ are output data from the optimization process calculated with a linear optimization using the input data from control valve (X1–X5) and the input data from the spool (Y1–Y3). It is noted that both ends of the spool Z1 and Z2 are first measured in order to determine the amount of spool which needs to be ground to achieve $Z1_{out}$ and $Z2_{out}$ thus matching the corresponding dimensions of the control valve body (CVB).

In the match grinding optimization of the present invention, $Z1_{out}$ and $Z2_{out}$ are solved so that $$(L,_{Fill}-L,_{Fill,\ nominal})^2+(L,_{Drain}-L,_{Drain,\ nominal})^2+s*(St-St_{nominal})^2=\text{minimum}$$

where:

Fill Overlap Length $L,_{Fill}=[X4+X3-Y2-2*Y1-2*Z1]$

Drain Overlap Length $L,_{DRAIN}=[2*X1-X2-X5+Y3-2*Z2+2*Z1]$

Stroke

St=[X1–Z2]

Sensitivity for Stroke s (factor to weight the importance of the stroke)

Nominal calculated values from nominal dimensions without tolerances

The input data in order to solve the above equation is:

X1 . . . X5: data from CVB.

Y1 . . . Y3: land location data relative to each other on the spool.

Z1 . . . Z2: initial land location data and overall length on the spool prior to match grinding.

D: spool diameter.

The output data from the optimization process is d1 . . . d2. The output data d1 . . . d2 is the grinding amount that has to be removed from Z1 and Z2 to adjust the overlap lengths and the spool stroke in order to achieve $Z1_{OPT}$ and $Z2_{OPT}$.

Now, $(L,_{Fill}-L,_{Fill,\ nominal})=D\ L,_{Fill}$ $(L,_{Drain}-L,_{Drain,\ nominal})=D\ L,_{Drain}$ $(St-St_{nominal})=D\ St$ $E=f(Z1,Z2)=D\ L,_{Fill}{}^2+D\ L,_{Drain}{}^2+s*D\ Str^2$ $dE/dZ1=0$ and $dE/dZ2=0\rightarrow Z1_{opt};\ Z2_{opt}$ $d1=Z1-Z1_{opt}$ $d2=Z2-Z2_{opt}$ While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of matching dimensions of a spool with a control valve body of a fuel injector, comprising the steps of:

measuring land locations and an overall length of a first component of the fuel injector;

measuring land locations of a second component of the fuel injector relative to at least each other; and calculating a grinding amount to be removed from the second component based on the measured amounts using a linear optimization process.

2. The method of claim 1, wherein the first component is a control valve body and the second component is a spool.

3. The method of claim 2, further comprising matching land locations of the control valve body and the spool based on the calculating step such that the land locations of the control valve body and the spool and an overall length of the control valve body and the spool optimize an overlap or alignment between the land locations of the control valve body and the spool without initial regard to specified tolerances.

4. The method of claim 1, further comprising matching the second component and the first component based on the calculating step such that the land locations of the first component and the second component and an overall length of the first component and the second component optimize an overlap or alignment between the land locations of the first component and the second component without initial regard to specified tolerances.

5. The method of claim 1, wherein:

the calculating step calculates a desired distance between one land location of the land locations and an end of the second component and an overall initial length of the second component in order to match with the land locations and overall length of the first component, wherein the calculating step is based on:

the measured land locations and the overall length of the first component; and the measured land locations of the second component relative to each other.

6. The method of claim 1, wherein:

X1 is a length of the first component;

X2 is a distance from a first end of the first component to a first open land;

X3 is a distance from the first end of the first component to a first close land;

X4 is a distance from the first end of the first component to a second close land;

X5 is a distance from the first end of the first component to a second open land;

Y1 is a distance between a first open land and a first close land of the second component;

Y2 is a distance between the first close land and a second close land of the second component;

Y3 is a distance between the first open land and a second open land of the second component;

Z1 is a pre-calculated distance between the first end of the second component and the first open land of the second component; and Z2 is a pre-calculated total initial length of the second component.

7. The method of claim 6, further comprising calculating a $Z1_{out}$ value, which is a distance between a first end of the second component and the first open land of the second component, and a $Z2_{out}$ value, which is an overall length of the second component, using output data from an optimization process calculated with a linear optimization using the X1–X5 values and the Y1–Y3 values.

8. The method of claim 6, wherein, $Z1_{out}$ and $Z2_{out}$ are solved so that $(L,_{Fill}-L,_{Fill,\ nominal})^2+(L,_{Drain}-L,_{Drain,\ nominal})^2+s*(St-St_{nominal})^2=\text{minimum}$, where:

$L,_{Fill}=[X4+X3-Y2-2*Y1-2*Z1]$;

$L,_{DRAIN}=[2*X1-X2-X5+Y3-2*Z2+2*Z1]$;

$St=[X1-Z2]$; and nominal is a calculated value from nominal dimensions of the first and second components without tolerances.

9. The method of claim 8, wherein the output data from the optimization process is d1 . . . d2, which is a grinding amount that is removed from Z1 and Z2 to adjust overlap lengths and a second component stroke in order to achieve an optimum Z1 and Z2 length, defined as $Z1_{opt}$ and $Z2_{opt}$, and wherein $(L,_{Fill}-L,_{Fill,\ nominal})=D\ L,_{Fill}$ $(L,_{Drain}-L,_{Drain,\ nominal})=D\ L,_{Drain}$ $(St-St_{nominal})=D\ St$ $E=f(Z1,Z2)=D\ L,_{Fill}{}^2+D\ L,_{Drain}{}^2+s*D\ Str^2$ $dE/dZ1=0$ and $dE/dZ2=0\rightarrow Z1_{opt}$; $Z2_{opt}$ $d1=Z1-Z1_{opt}$ $d2=Z2-Z2_{opt}$.

10. The method of claim 6, further comprising:

(a) measuring a distance between both ends of the second component; and (b) measuring a distance from a first end of the second component to the another open land of the second component; and determining an amount of the second component which needs to be ground to achieve an optimum Z1 and Z2 length corresponding dimensions of the first component; and grinding or removing the determined amount from the measured distances in the measuring steps of (a) and (b).

11. The method of claim 6, wherein one of the first and second components are opened or widened and matched with the other of the first and second components by adjusting fewer than all of the dimensions for overlap length and the stroke of the second component based on the calculating step.

12. The method of claim 11, wherein the fewer than all of the dimensions are two of ten dimensions associated the land locations and overall length of the first and second components.

13. The method of claim 12, wherein eight of the ten dimensions are ground according to the calculating step and the remaining two dimensions, which are pre-manufactured, are adjusted to the eight dimensions to achieve a desired overlap length and stroke between the first and second components after the calculating step is performed.

14. The method of claim 12, wherein the remaining two dimensions are an overall length of the second component and a distance between one end of the second component and the first open land location.

15. The method of claim 12, wherein the first component is a control valve body and the second component is a spool.

16. A method of matching dimensions of a spool with a control valve body of a fuel injector, comprising the steps of:

measuring a plurality of dimension of a control valve body including a length and distances from one end to a plurality of land locations;

measuring a plurality of land locations of a spool with respect to one another, the plurality of spool land locations corresponding to the plurality of control valve body land locations; and calculating a grinding amount to be removed from the spool based on:

the measured land locations and the overall length of the control valve body; and the measured land locations of the spool relative to each other.

17. The method of claim 16, further comprising matching the plurality of land locations of the control valve body and the spool based on the calculating step such that the plurality of land locations of the control valve body and the spool and an overall length of the control valve body and the spool optimize an overlap or alignment between the plurality of land locations of the control valve body and the spool without initial regard to specified tolerances.

18. The method of claim 16, wherein:

X1 is a length of the control valve body;

X2 is a distance from a first end of the control valve body to a first open land;

X3 is a distance from the first end of the control valve body to a first close land;

X4 is a distance from the first end of the control valve body to a second close land;

X5 is a distance from the first end of the control valve body to a second open land;

Y1 is a distance between a first open land and a first close land of the spool;

Y2 is a distance between the first close land and a second close land of the spool;

Y3 is a distance between the first open land and a second open land of the spool;

Z1 is a first known distance between the first end of the spool and the first open land of the spool; and Z2 is a total initial length of the spool.

19. The method of claim 18, further comprising calculating a $Z1_{out}$ value, which is a distance between a first end of the second component and the first open land of the second component, and a $Z2_{out}$ value, which is an overall length of the second component, using output data from an optimization process calculated with a linear optimization, wherein, $Z1_{out}$ and $Z2_{out}$ are solved so that $(L,_{Fill}-L,_{Fill,\ nominal})^2+(L,_{Drain}-L,_{Drain,\ nominal})^2+s*(St-St_{nominal})^2=$minimum, where:

$L,_{Fill}=[X4+X3-Y2-2*Y1-2*Z1]$;

$L,_{DRAIN}=[2*X1-X2-X5+Y3-2*Z2+2*Z1]$;

$St=[X1-Z2]$; and nominal is a calculated value from nominal dimensions of the first and second components without tolerances, the output data from the optimization process is d1 . . . d2, which is a grinding amount that is removed from Z1 and Z2 to adjust overlap lengths and a second component stroke in order to achieve an optimum length of Z1 and Z2, defined as $Z1_{opt}$ and $Z2_{opt}$, and $(L,_{Fill}-L,_{Fill,\ nominal})=D\ L,_{Fill}$ $(L,_{Drain}-L,_{Drain,\ nominal})=D\ L,_{Drain}$ $(St-St_{nominal})=D\ St$ $E=f(Z1,Z2)=D\ L,_{Fill}{}^2+D\ L,_{Drain}{}^2+s*D\ Str^2$ $dE/dZ1=0$ and $dE/dZ2=0\rightarrow Z1_{opt}$; $Z2_{opt}$ $d1=Z1-Z1_{opt}$ $d2=Z2-Z2_{opt}$.

20. The method of claim 16, wherein dimensions of one of the spool and the control valve body is opened or widened and matched with the other of the spool and the control valve body by adjusting fewer than all of the dimensions for overlap length and the based on the calculating step.

* * * * *